(12) United States Patent     (10) Patent No.: US 12,657,160 B2

Chang     (45) Date of Patent: Jun. 16, 2026

(54) AUTOMATIC FILE CREATION AND LOCATION SELECTION STANDARDIZATION

(71) Applicant: Wells Fargo Bank, N.A., San Francisco, CA (US)

(72) Inventor: Shannon H. Chang, Tucson, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 179 days.

(21) Appl. No.: 18/453,918

(22) Filed: Aug. 22, 2023

(65) Prior Publication Data

US 2025/0068592 A1    Feb. 27, 2025

(51) Int. Cl.
   *G06F 16/16*      (2019.01)
   *G06F 21/62*      (2013.01)

(52) U.S. Cl.
   CPC .......... *G06F 16/168* (2019.01); *G06F 16/164* (2019.01); *G06F 21/6209* (2013.01)

(58) Field of Classification Search
   CPC ...... G06F 16/168; G06F 16/29; G06F 16/904; G06F 16/909; G06F 16/3329; G06F 16/212; G06F 16/9537; G06F 16/156; G06F 16/164; G06F 21/6209
   See application file for complete search history.

(56) References Cited

U.S. PATENT DOCUMENTS 5,765,156 A    6/1998   Guzak et al.
7,024,403 B2 *   4/2006   Kyler .................... G06F 21/564
                                     709/224

7,180,540 B2    2/2007   Son
7,818,456 B2   10/2010   Carro
8,065,534 B2   11/2011   Tan et al.
9,235,812 B2 *   1/2016   Scholtes ................ G06N 20/00
9,378,213 B2    6/2016   Hayakawa
10,417,179 B2    9/2019   Lee (Continued)

FOREIGN PATENT DOCUMENTS

CN      105843903      8/2016
CN      109325738      2/2019

(Continued)

*Primary Examiner* — Ajay M Bhatia

*Assistant Examiner* — Berhanu Mitiku

(74) *Attorney, Agent, or Firm* — SCHWEGMAN LUNDBERG & WOESSNER, P.A.

(57) ABSTRACT

Systems and techniques for automatic file creation and location selection standardization are described herein. An electronic file storage structure configuration may be received for an application. An electronic file configuration for the application may be received. A configuration prediction machine learning model may be trained using the electronic file storage structure configuration, the electronic file configuration, and application data. User activity data may be obtained for a user activity initiated using the application. The user activity data may be evaluated using the configuration prediction machine learning model to output a predicted file storage structure configuration and a predicted file configuration. A configuration user interface may be generated using the predicted file storage structure configuration and the predicted file configuration. The configuration user interface may be presented to a user.

20 Claims, 8 Drawing Sheets

(56)     References Cited

U.S. PATENT DOCUMENTS

| | | | |
|---|---|---|---|
| 11,409,820 B1 * | 8/2022 | Gutierrez | G06F 16/9538 |
| 2002/0138746 A1 | 9/2002 | Buttner et al. | |
| 2005/0010610 A1 | 1/2005 | Nishimura | |
| 2014/0101310 A1 | 4/2014 | Savage et al. | |
| 2021/0304056 A1 * | 9/2021 | Qi | G06N 3/09 |
| 2022/0092101 A1 * | 3/2022 | Yun | G06N 20/00 |
| 2023/0401222 A1 * | 12/2023 | Gutiérrez | G06F 16/14 |

FOREIGN PATENT DOCUMENTS

| | | |
|---|---|---|
| CN | 106453453 | 10/2019 |
| CN | 115470013 | 12/2022 |

* cited by examiner

*300

| SELECT ORGANIZATIONAL UNITS & DESCRIPTIONS THAT APPLY | | |
|---|---|---|
| | OU (folder, shared drive, etc) | File Name |
| Global Categories: | | |
| Line(s) of Business 1 | Technology | Tech |
| | Financial Services | Finance |
| Team Name(s) | TeamA | tm1 |
| | TeamB | tm2 |
| | PartnerTeam | pt1 |
| Audit Files / Artifacts | TransactionExport | --- |
| | Audit | --- |
| Team Categories: | | |
| Project Name / ID | ProjectA | prjA |
| | ProjectB | prjB |
| Iteration | Quarterly | Q1 |
| | Quarterly | Q2 |
| | Annual2023 | 2023 |
| Host Name / ID | --- | host1 |
| | --- | hostb |
| | --- | C-12345 |
| Audience | --- | users, team, all hands, dev, etc. |
| User Categories: | | |
| DateTime | --- | <year-month-date> |
| Audience | MyNotes | notes |
| | --- | report |
| | --- | presentation |
| Action | --- | analysis |
| | --- | design |
| | --- | build |
| | --- | review |
| | --- | signoff |
| Type of File | --- | form |
| | --- | worksheet |
| | --- | report |
| | --- | documentation |
| | --- | certs |
| | --- | logs |
| Short Description | | |
| Auto Increment | ☐ | ☐ |
| Version file | ☐ | ☐ |

FILE CREATE

Global Categories:

| | | OU (folder, shared drive, etc) | File Name |
|---|---|---|---|
| ☐ | Line(s) of Business 1 | Technology ▷ | Tech ▷ |
| ☐ | Team Name(s) | TeamA ▷ | tm1 ▷ |
| ☐ | Audit Files / Artifacts | TransactionExport ▷ | ---- ▷ |

Team Categories:

| ☐ | Project Name / ID | ProjectA ▷ | prjA ▷ |
| ☐ | Iteration | Quarterly ▷ | Q1 ▷ |
| ☐ | Host Name / ID | --- ▷ | host1 ▷ |

User Categories:

| ☐ | DateTime | --- ▷ | <year-month-date> ▷ |
| ☐ | Audience | MyNotes ▷ | notes ▷ |
| ☐ | Action | --- ▷ | analysis ▷ |
| ☐ | Type of File | --- ▷ | form ▷ |

Create File    Open Path    Copy Filename

*FIG. 5*

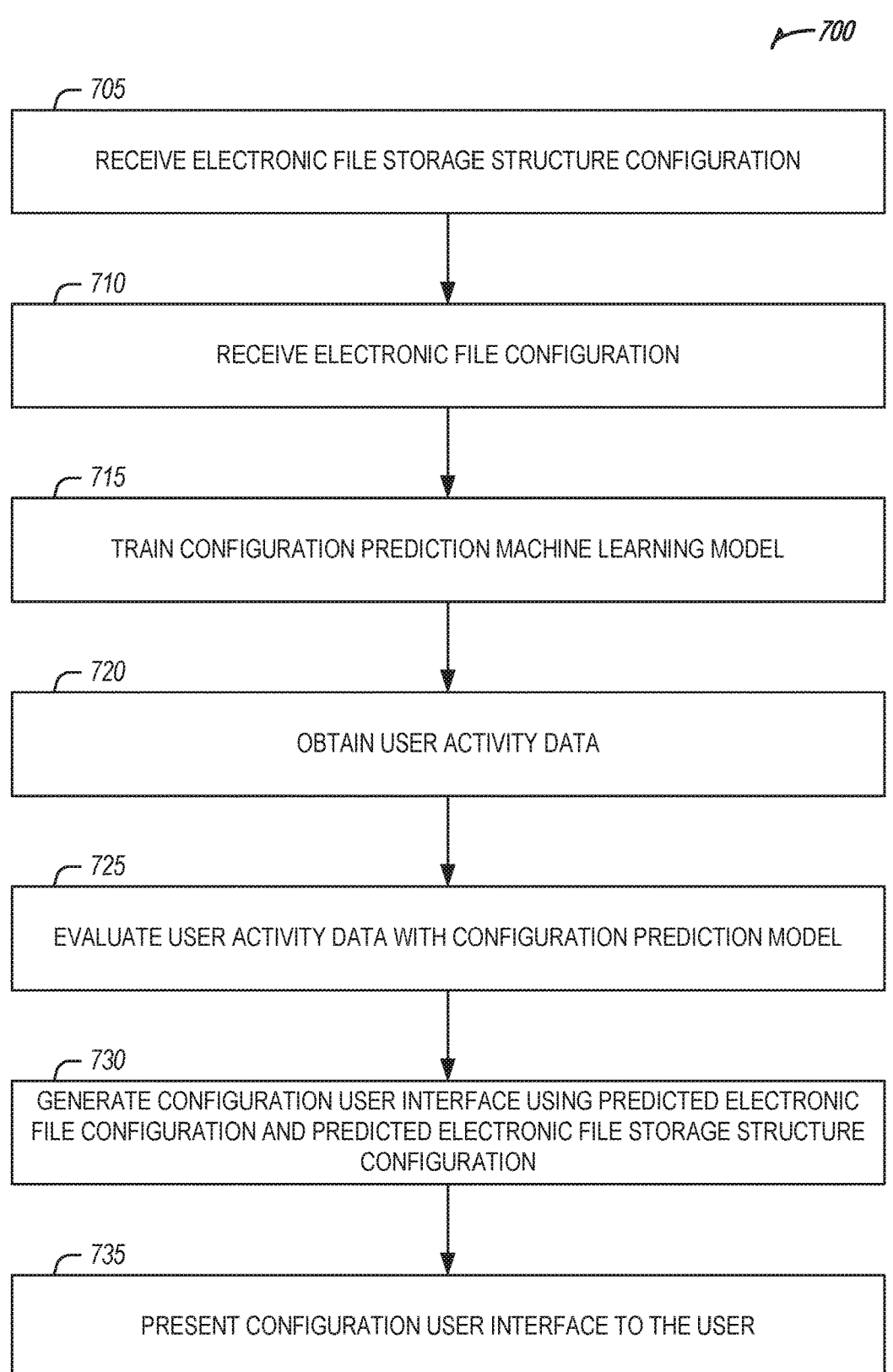

*700*

705

RECEIVE ELECTRONIC FILE STORAGE STRUCTURE CONFIGURATION

710

RECEIVE ELECTRONIC FILE CONFIGURATION

715

TRAIN CONFIGURATION PREDICTION MACHINE LEARNING MODEL

720

OBTAIN USER ACTIVITY DATA

725

EVALUATE USER ACTIVITY DATA WITH CONFIGURATION PREDICTION MODEL

730

GENERATE CONFIGURATION USER INTERFACE USING PREDICTED ELECTRONIC FILE CONFIGURATION AND PREDICTED ELECTRONIC FILE STORAGE STRUCTURE CONFIGURATION

735

PRESENT CONFIGURATION USER INTERFACE TO THE USER

*FIG. 7*

AUTOMATIC FILE CREATION AND LOCATION SELECTION STANDARDIZATION

TECHNICAL FIELD

Embodiments described herein generally relate to electronic file storage and, in some embodiments, more specifically to automatic standardization of file configuration and file storage locations.

BACKGROUND

Electronically stored data may consist of a variety of electronic files that store various information. Electronic file creators may create files with varying configurations leading to inconsistencies in data types and data definitions. The file creators may also store electronic files in different file structures or locations leading to expenditures of increased search processing to locate the electronic files.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates an example of a user interface for organizational unit and description selection for automatic file creation and location selection standardization, according to an embodiment.

FIG. 5 illustrates an example of a file creation user interface for automatic file creation and location selection standardization, according to an embodiment.

FIG. 7 illustrates an example of a method for automatic file creation and location selection standardization, according to an embodiment.

DETAILED DESCRIPTION

Figure 1:
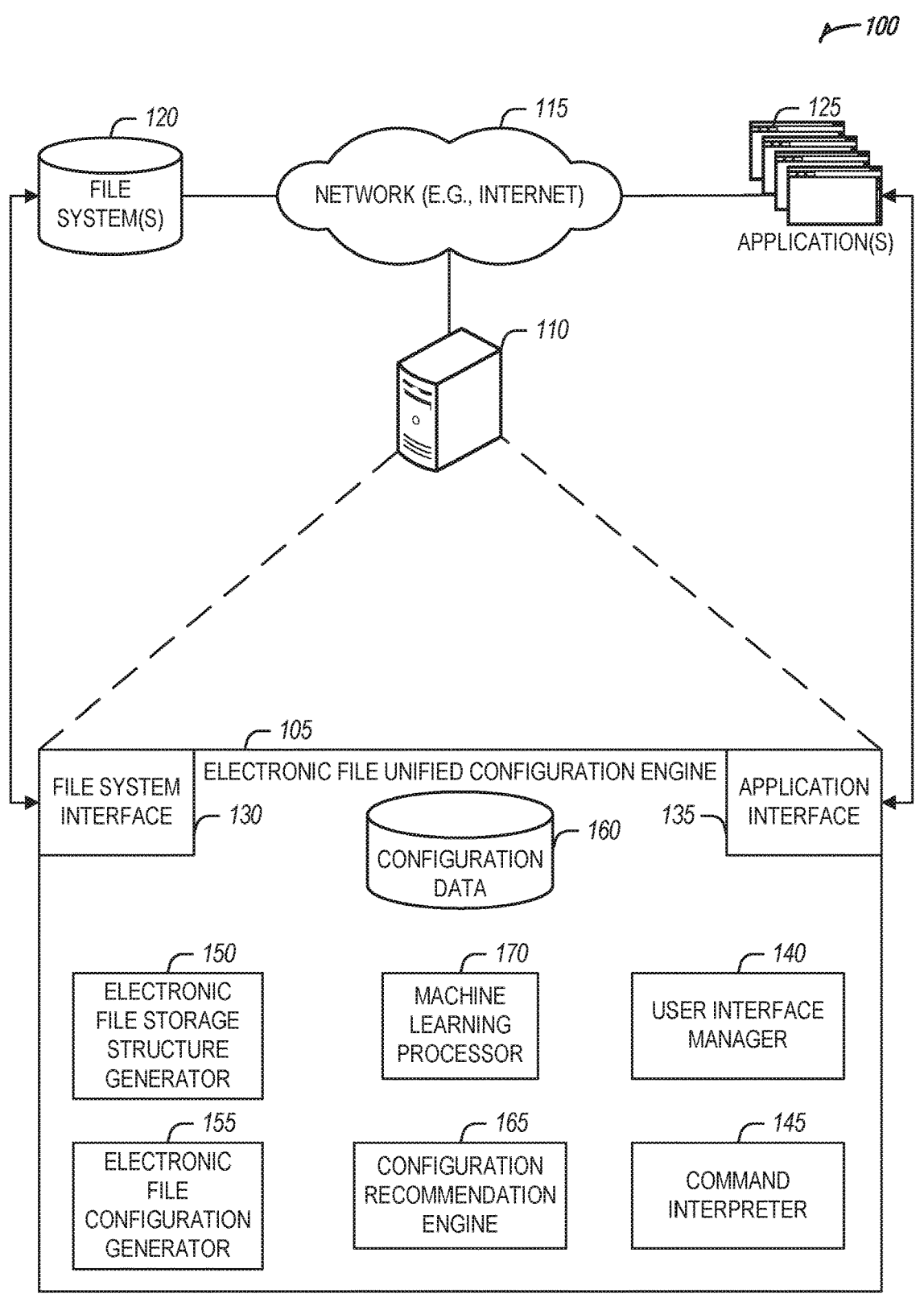
FIG. 1 is a block diagram of an example of an environment and a system for automatic file creation and location selection standardization, according to an embodiment.

Electronic data files include a variety of configuration option that may be configured during file creation. For example, a file type, a file name, data fields, a data file schema, etc. may be configured upon creation of an electronic file. A storage location of the electronic file may also be selected upon creation of the electronic file. The variability in electronic file configuration and storage location selection leads to inconsistencies in electronic file structure and storage hierarchy. To address these inconsistencies, electronic file search techniques have been used to locate electronic files with similar features to accommodate variations in structure and storage hierarchy. However, using search techniques to locate files uses computing resources including computer processing cycles and computer memory capacity. In addition to unnecessary computing hardware utilization, conducting search functions delays computing functions that use the electronic files that are being located.

The systems and techniques discussed herein enable the computing device to deliver an electronic file storage function using reduced processor and memory resources by avoiding the use of search functions to locate files and by standardizing electronic file configurations to reduce the complexity of data extraction from the electronic files. A user interface is provided to enable a user to create or edit a file. A user prompt queries the user for how the user would like to organize the electronic file hierarchy to create a new electronic file hierarchy. The defined organization for the electronic file hierarchy is mapped to folder and file naming systems.

Examples of information collected during electronic file organizational definition includes project name, project summary, project type, whether the project is existing or new, a project version, etc. Upon confirmation of selected configuration options, an electronic file storage hierarchy is generated in an electronic file storage system. An electronic file storage location and a filename are automatically generated and placed in a an electronic clipboard of the computing device. A software application used to create the electronic file is automatically launched and the user pastes the filename from the electronic clipboard, the software application may autofill file name and path fields with the filename and storage location, etc. The path and filename are saved to a file organizer.

Options for the filename include random generators to hide a filename while mapping the filename to a location or creating an alias for the filename so that the file is able to be found in the software application. Options are provided to enable designation of templates for file types so that initial file configuration includes options configured in the template.

The systems and techniques discussed herein enable multi-system electronic file configuration and location standardization. File tracking is included to enable a user to see a footprint of user file usage, etc. A user is also enabled to see file history to get overview of file usage, configuration patterns, storage utilization patterns, etc. The file configuration and location standardization engine may be implemented as a software client, application plugin, etc. to create connections between a centralized or distributed repository to synchronize file configuration settings, templates, etc. between a user computing device and the repository to maintain records of file creation and access. In an example, the repository may include a database that includes file history, file configurations, templates, usage data, etc.

A user interface is displayed to the user for preference collection. The preference collection user interface may present suggested templates to the user based on initial configuration options selected, a project type, etc. In an example, the user interface may include a variety of prompts of a questionnaire that asks the user for input regarding, clients, organizations, etc. are associated with the project. File content flows through client and the user may be prompted for additional information when files are accessed/created. A machine learning processor is used to learn user preferences. For example, pattern matching may be used to identify a preference of the user based on similar repetitious user option selections, etc. In an example, the machine learning processor processes configuration inputs and learns patterns that may be reapplied in similar contexts. In another example, fingerprinting may be used to create a fingerprint of configurations for file or project types. The user interface may include prompts that may prompt the user to apply a structure, format, etc. In an example, the data storage structure may be shifted by enabling the user to view the structure at a higher level to enable the user to re-sort the structure based on the higher level view. In an example, a sorting algorithm based on relationships between fields, etc. may be used to identify similarities between files to recommend configurations.

When a user selects a configuration for new file (e.g., file type, etc.) a preview and suggestions are displayed in a user interface. When the user applies suggested templates or is otherwise satisfied with the preview, the file is generated with the selected configuration options. When the user creates a new file associated with the configuration, the configuration is automatically applied. The configuration may be pushed or otherwise distributed to other user computing devices/clients so that when they create a new file it will also be configured with the designated configuration options.

Configurations may be created and distributed from a central source to clients throughout an organization (e.g., a group, team, by job junction, location, etc.). For example, an organizational group may have specific configuration preferences or there may be other systemwide preferences that are enforced through the client (e.g., labeling, security, etc.) with different levels of override restrictions.

A virtualized application manager may be activated when a user launches a managed file using a configuration. The virtualized application manager may provide instances of a software application identified in the configuration and may track available licenses for the software application. When the user initiate a file open action for the managed file, a computing device may be assigned a license and the software application may be installed on the computing device or link or other mechanism for accessing a virtual instance of the software application may be transmitted to the computing device. When the user initiates a file close operation, access to the software application may be removed (e.g., software application uninstalled, link deleted, access revoked for a user ID of the user, etc.) and the virtualized application manager may unassign the license from the user and return the license to a license inventory for the software application enabling maximization of software licenses by providing just-in-time license assignment that uses an available license while the software application is actively in use.

FIG. 1 is a block diagram of an example of an environment 100 and a system 105 for automatic file creation and location selection standardization, according to an embodiment. The environment 100 may include the system 105 that may be executed by a computing device 110 (e.g., a standalone computing device, a server computing device, a cloud computing platform, a software-as-a-service (SaaS) platform, a virtual computing platform, etc.). The computing device 110 may be communicatively coupled to electronic file storage system(s) 120 (e.g., a network attached storage system (NAS), local server storage, cloud storage platform, database, etc.) and software application(s) 125 (e.g., user desktop applications, web-based applications, etc.) via a network 115 (e.g., a local area network, a wide area network, a wireless network, a cellular network, a satellite communications network, etc.).

In an example, the system 105 may be an electronic file unified configuration engine. The system 105 may include a number of components including a file system interface 130, an application interface 135, a user interface manager 140, a command interpreter 145, an electronic file storage structure generator 150, an electronic file configuration generator 155, configuration data storage 160, a configuration recommendation engine 165, and a machine learning processor 170.

The file system interface 130 collects data from the electronic file storage system(s) 120 and transmits commands to the electronic file storage system(s) 120 to create, edit, and delete file data structures. In an example, the file system interface 130 may include a variety of application programming interface (API) components and commands that enable the file system interface 130 to interact with file systems of various types. In an example, the file system interface 130 may include an authentication facility that may use credentials assigned to file system interface 130 or credentials of a user passed through the file system interface 130 to authenticate the file system interface 130 with the electronic file storage system(s) 120.

Figure 2:
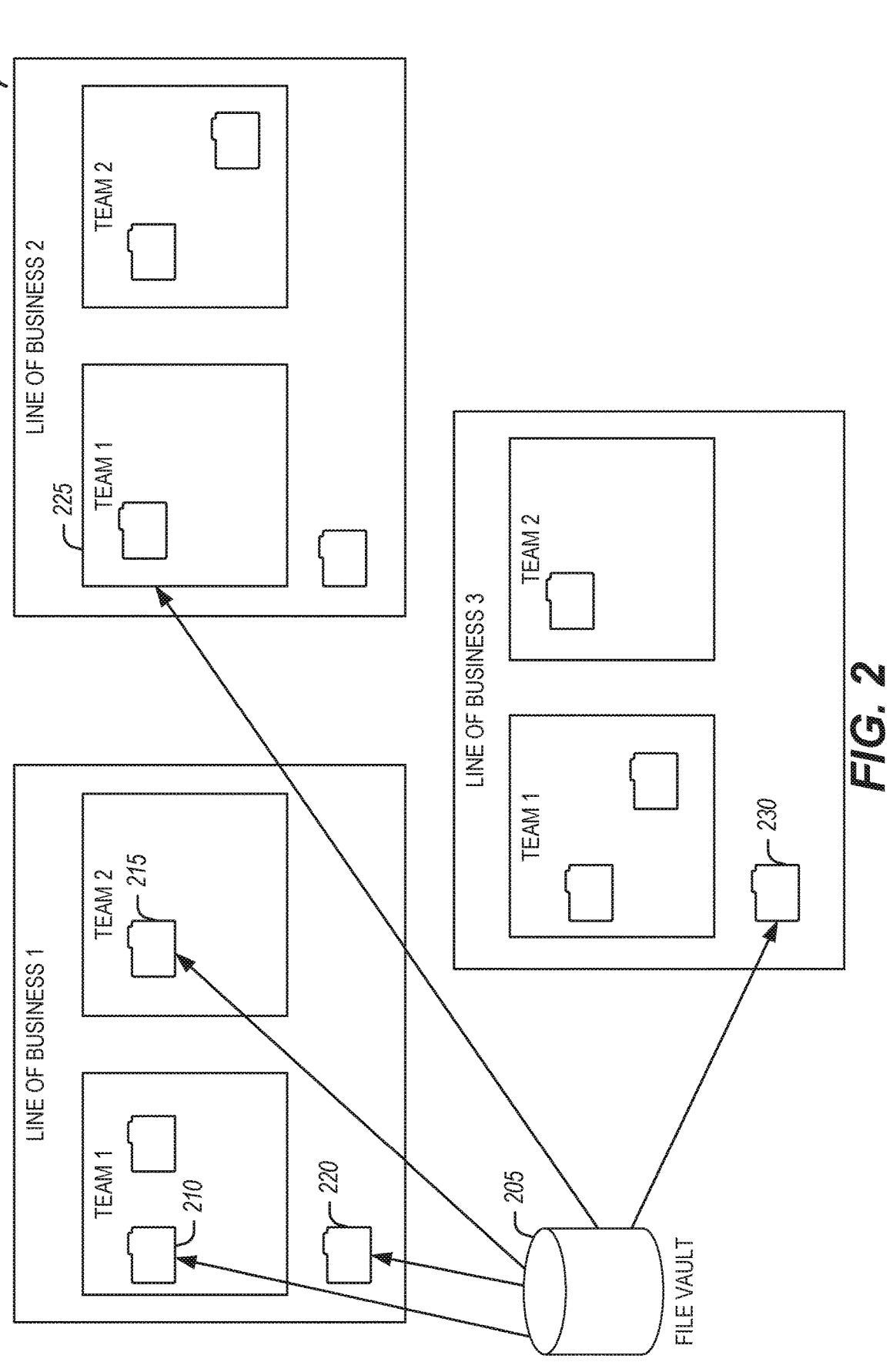
FIG. 2 illustrates an example of a hierarchical organizational structure based on lines of business for automatic file creation and location selection standardization, according to an embodiment.

FIG. 2 illustrates an example of a hierarchical organizational structure 200 based on lines of business for automatic file creation and location selection standardization, according to an embodiment. A profile for a user may include a file vault 205 that defines file system objects that are owned by the user or accessible by the user in the hierarchical organizational structure 200. For example, the hierarchical organizational structure 200 may include objects for a first business unit, a second business unit, and a third business unit that may each include folders and files accessible by team 1 and team 2 and files or folders that are not team specific. The user may have ownership or access rights at various levels. For example, the file vault of the user may include folder 310 that is a member of a team 1 collection of the first line of business, folder 315 that is a member of a team 2 collection of the first line of business, folder 320 that is a member of the first line of business, the team 1 collection 325 of the second line of business, and folder 330 that is a member of the third line of business. This enables users across multiple groups to own or be assigned rights or file configurations across the various groups.

Returning to the description of FIG. 1, the application interface 135 collects data from the application(s) 125 and transmits commands to the application(s) 125 to create, edit, and delete electronic file configurations. In an example, the application interface 135 may include a variety of API components and commands that enable the application interface 135 to interact with applications of various types. In an example, the application interface 135 may include an authentication facility that may use credentials assigned to application interface 135 or credentials of a user passed through the application interface 135 to authenticate the application interface 135 with the application(s) 125. In an example, the application interface 135 may include application installable plug-ins that, when installed in an application, communicatively couple the application to the system 105. The plug-in may take control application functions such as file manipulation features of the application. In another example, the application interface 135 may include a desktop, web-based, or other software application that may be installed on a user computing device, server computing device, cloud computing device or the like. A user may access the software application to perform file manipulation tasks. The software application may include local and remote application interfaces that connect to the application(s) 125 to control file manipulation operations for the application(s) 125.

The user interface manager 140 generates user interface objects for presentation to a user. The user interface manager 140 may work in conjunction with the command interpreter 145 to generate user interface objects that are compatible with a specific application of the application(s) 125. For example, a word processing application may use different electronic file storage location and electronic file configuration commands than a customer management application. In an example, a word processing application by a first manufacturer may use different commands than a word processing application by a second manufacturer. The command interpreter 145 identifies an application (e.g., via an application identifier, configuration file, file location, file name, etc.) and identifies valid commands for the identified application. In an example, the command interpreter 145 may maintain a file, database, or other storage mechanism that includes a cross reference map of commands native to the system 105 to commands of the application(s) 125.

The user interface manager 140 may reference the map of commands when generating a user interface for display of the user to provide the user with application specific prompts. In an example, the interpreted commands may be stored by the user interface manager 140 and executed by the application interface 135 when a user initiates a file configuration or file configuration change. In an example, the application interface 135 may receive an indication of the application information from the command interpreter 145 and may convert the native commands or the interpretated commands into API specific commands for application interaction.

A user may initiate creation of an electronic file structure and an electronic file configuration by opening a software application of the application(s) 125. In an example, the application interface may include an application plugin the is installed in the application. In an example, a standalone application may be provided that enables the user to select a target application of the application(s) 125. For example, the user interface manager 140 may generate a user interface that includes an application selection element that, upon selection of a sub-element, initiates electronic file structure and storage location selection for a target application associated with the sub-element.

An electronic file storage configuration user interface may be generated by the user interface manager 140 that enables the user to select an electronic file storage structure for a project, file type, etc. The user interface may work in conjunction with the file system interface 130 to collect and display electronic file storage data from the electronic file storage system(s) 120. For example, a directory hierarchy, folder system, etc. may be collected and displayed in the user interface. The user may select an electronic file storage location for the project, file type, etc. When the user makes a selection and commits the selection (e.g., by clicking a finish button, apply button, checking a checkbox, taking a confirmation action, etc.) the electronic file storage structure generator 150 generates an electronic file storage structure for the project, file type, etc. and stores the electronic file structure in the configuration data 160. In an example, the user may create a new electronic file structure within the electronic file storage system(s) 120 and the electronic file storage structure generator 150 may work in conjunction with the command interpreter 145 to generate and execute commands on the electronic file storage system(s) 120 to create the electronic file storage structure within a file system, storage hierarchy, etc. For example, a new folder structure may be generated on a network attached storage share.

An electronic file configuration user interface may be generated by the user interface manager 140 that enables the user to select an electronic file configuration for a project, file type, etc. The user interface may work in conjunction with the application interface 135 to collect and display electronic file configuration data from the application(s) 125. For example, available file types, data fields, file name syntax, file extensions, etc. may be collected and displayed in the user interface. The user may select an electronic file configuration for the project, file type, etc. by selecting configuration options vis the user interface. For example, the user may designate a file name mask to be applied to files created for the project or of the file type. For example, the file name mask may cause a file created by the user or another user to begin with Project_Infinity where the user or other user may select additional characters for a file to be created or saved. For example, the final file name may be Project_Infinity_workfile.doc being a combination of the file name mask and the user provided text. This enforces a standard file naming structure for files reducing search processing when locating files for the project. Other configuration options, by way of example and not limitation, may include pre-filled fields, embedded dates, metadata definitions, etc.

FIG. 3 illustrates an example of a user interface 300 for organizational unit and description selection for automatic file creation and location selection standardization, according to an embodiment. The user interface 300 includes a variety of configuration options that may be set by the user to generate a configuration for a file location and/or file.

Returning to the description of FIG. 1, when the user makes and commits the selections (e.g., by clicking a finish button, apply button, checking a checkbox, taking a confirmation action, etc.) the electronic file configuration generator 155 generates an electronic file configuration for the project, file type, etc. and stores the electronic file configuration in the configuration data 160. The electronic file configuration may be accessed by the application(s) 125 (e.g., via communication with the application interface 135, etc.) and applied to a project, file type, etc. opened or created using the application(s) 125. The configuration data storage 160 stores the electronic file storage structures, electronic file configurations, and other data of the system 105. The configuration data storage 160 may be a flat file, a structured database, an unstructured database, or other storage data structure.

The electronic file storage structure configurations and electronic file configurations are used to standardize electronic file operations by applying a common set of configurations file operations across multiple instances of an application. For example, the user creating a configuration may set file storage locations and file configuration options such as file naming convention, pre-filled data, etc. in the configurations generated by the electronic file storage structure generator 150 and the electronic file configuration generator 155. These configurations are accessed from the configuration storage via the application interface 135 when a user accesses one of the application(s) 125. Standard configurations are enforced by the centralized management of the configurations with the distributed instances of the application(s) 125 retrieving the configurations based on detection of a project, file type, etc. being selected in an application.

Users may be presented with a file structure view, file view, project overview, and other user interfaces (e.g., similar to the hierarchical organizational structure 200 as described in FIG. 2, etc.) that enable to the user to view configurations at various levels in the electronic file system (s), projects, their personal file configuration hierarchy, etc. These user interfaces enable the user to obtain views of the structure of the electronic file storage and file configurations. In an example, a user may be able to reorganize the structures by dragging and dropping or otherwise interacting with the user interface to reorganize the arrangement of file structures and file configurations. For example, a project may include a variety of nested files with each file having an electronic file configuration. The user may be presented with a user interface that displays the hierarchy and includes controls to reorganize the hierarchy. When a user interacts with the hierarchy, the user may drag a first file configuration above a second file configuration. This may move the sequence of file operations with the first electronic file configuration being triggered before the second electronic file configuration. The interaction may also cause a change in the file storage structure by placing files created using the first electronic file configuration to be placed in a folder above files created using the second electronic file configuration.

The configuration recommendation engine 165 works in conjunction with the application interface 135 to provide configuration recommendations based on the electronic file storage structures and electronic file configurations stored in the configuration data 160. The configuration recommendations may be presented in a user interface generated and output by the user interface manager 140. A user may configure override rules for an electronic file storage structure and an electronic file configuration that designates configuration options that may not be configurable by a subsequent user of an application and configuration options that a user may be allowed to edit when a file is created or modified. For example, the electronic file storage structure may not be overridable preventing a user from changing a designated storage location for a file. In an example, the electronic file configuration may allow a user to append a designated name, but may not allow the user to remove or change the file name mask. It will be understood that variety of combinations of overridable and non-overridable options may be set for the electronic file storage structure and the electronic file configuration.

In an example, users may authenticate with the system 105 and the override configuration may vary depending on the user credentials supplied by the user. For example, a user authenticating with project manager credentials may be able to override the file name mask while a user authenticating with project member credentials may be prevented from overriding the file name mask.

In an example, an electronic file storage structure and an electronic file configuration may be selected for a current user action (e.g., creating a project, file, etc.) by the configuration recommendation engine 165. The configuration options designated by the configurations may be automatically applied and the user may be presented with prompts that request additional electronic file storage or electronic file configuration information for creating a file. For example, a storage location may be designated automatically and the user may be prompted for file information including a date, file identifier, etc. In an example, the user may be prompted to override configuration options that are allowed for the user.

The machine learning processor 170 may collect and evaluate electronic file storage structure configurations and electronic file configurations to learn preferences based on project data, file type data, user activity, etc. The preferences may be learned at various levels including a system level and a user level. In an example, the machine learning processor 170 may use a variety of machine learning techniques and algorithms to evaluate the data to train models that the machine learning processor 170 may use to evaluate input data for a current user action. For example, pattern matching may be used to identify a preference of the user based on similar repetitious user option selections, etc. In an example, the machine learning processor 170 processes configuration inputs and learns patterns that may be reapplied in similar contexts. In another example, fingerprinting may be used to create a fingerprint of configurations for file or project types.

Application data input from the application(s) 125 via the application interface 135 may be evaluated using the machine learning models built by the machine learning processor 170 to select one or more electronic file storage structures and/or electronic file configurations from the configuration storage 160 for presentation to the user as configuration recommendations by the configuration recommendation engine 175. For example, the configuration may be selected based on a probability calculated by the machine learning processor 170 that a configuration matches data associated with the user activity. In an example, predictions may have various granularity allowing predictions to be made for individual configuration options. Thus, a new configuration may be recommended with a set of predicted configuration options for the user activity.

Figure 4:
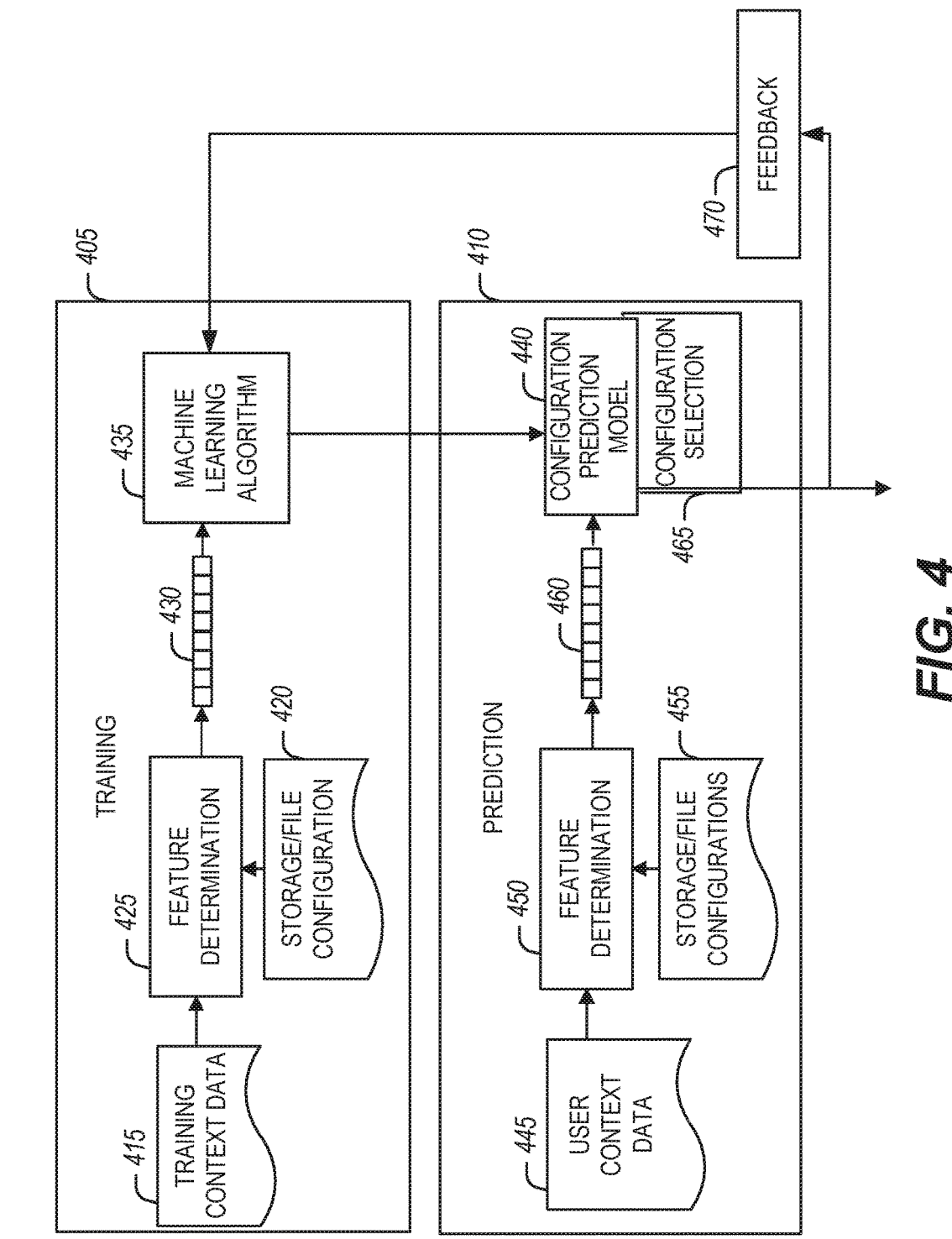
FIG. 4 illustrates an example machine learning component for configuration option recommendation selection for automatic file creation and location selection standardization, according to an embodiment.

FIG. 4 illustrates an example machine learning component 200 for configuration option recommendation selection for automatic file creation and location selection standardization, according to an embodiment. The machine learning component 200 may be a component of the machine learning processor 170 as described in FIG. 1 and may be used in conjunction with the command recommendation engine 165 as described in FIG. 1. The machine learning component utilizes a training module 405 and a prediction module 410. Training module 405 feeds training context data 415 and electronic files storage structure and file configuration data 420 into feature determination module 425 which determines one or more features 430 from this information. Features 430 are a subset of the information input and is information determined to be predictive of relevant configuration options for a user activity based on previously created electronic file storage structure and electronic file configurations for previous contexts. Examples include one or more of: file location, file name, file storage hierarchy, override rules, etc.

The machine learning algorithm 435 produces a configuration option prediction model 440 based upon the features and feedback 470 associated with those features. For example, the features associated with past configuration options selected in prior contexts are used as a set of training data. As noted above, the configuration option prediction model 440 may be for the entire system (e.g., built of training data accumulated throughout the entire system, regardless of the user for which a resource is being selected), or may be built specific for each user, user group, project type, file type, etc.

In the prediction module 410, the current user context data 445 (e.g., data describing a current user activity, etc.) may be input to the feature determination module 450. Similarly applicable electronic file storage configurations and electronic file configurations 455 are also input to the feature determination module 450. Feature determination module 450 may determine the same set of features or a different set of features as feature determination module 425. In some examples, feature determination module 450 and 425 are the same module. Feature determination module 450 produces features 460, which are input into the configuration option prediction model 440 to perform configuration option selection 465. The training module 405 may operate in an offline manner to train the configuration option prediction model 440. The prediction module 410, however, may be designed to operate in an online manner as each user context is evaluated as location-based events occur.

It should be noted that the configuration option prediction model 440 may be periodically updated via additional training and/or user feedback 470. The user feedback 470 may be feedback from users that provide explicit feedback (e.g., responses to questions about whether a suggested configuration option was relevant, etc.) or may be automated feedback 470 based on outcomes of the selected configuration options provided to the user. For example, a user configuring a file may provide an explicit response indicating a preference for alternate configuration options and the response may be used as additional training data for updating the configuration option prediction model 440. In an example, a context profile may be generated for the user that is stored in a user data store. The stored context profile may be periodically updated as the context of the user changes (e.g., as task change, job role changes, team membership changes, interests change, etc.). The stored context profile may reduce processing of user context data by providing a baseline user context that may be enhanced based on current activity context. The baseline or enhanced context data may be evaluated using the configuration option prediction model 440 to predict relevant configuration options.

The machine learning algorithm 435 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chisquared Automatic Interaction Detector (CHAID), and the like), random forests, linear classifiers, quadratic classifiers, k-nearest neighbor, linear regression, and hidden Markov models. Examples of unsupervised learning algorithms include expectation-maximization algorithms, vector quantization, and information bottleneck method. In an example embodiment, a multi-class logistical regression model is used.

Figure 8:
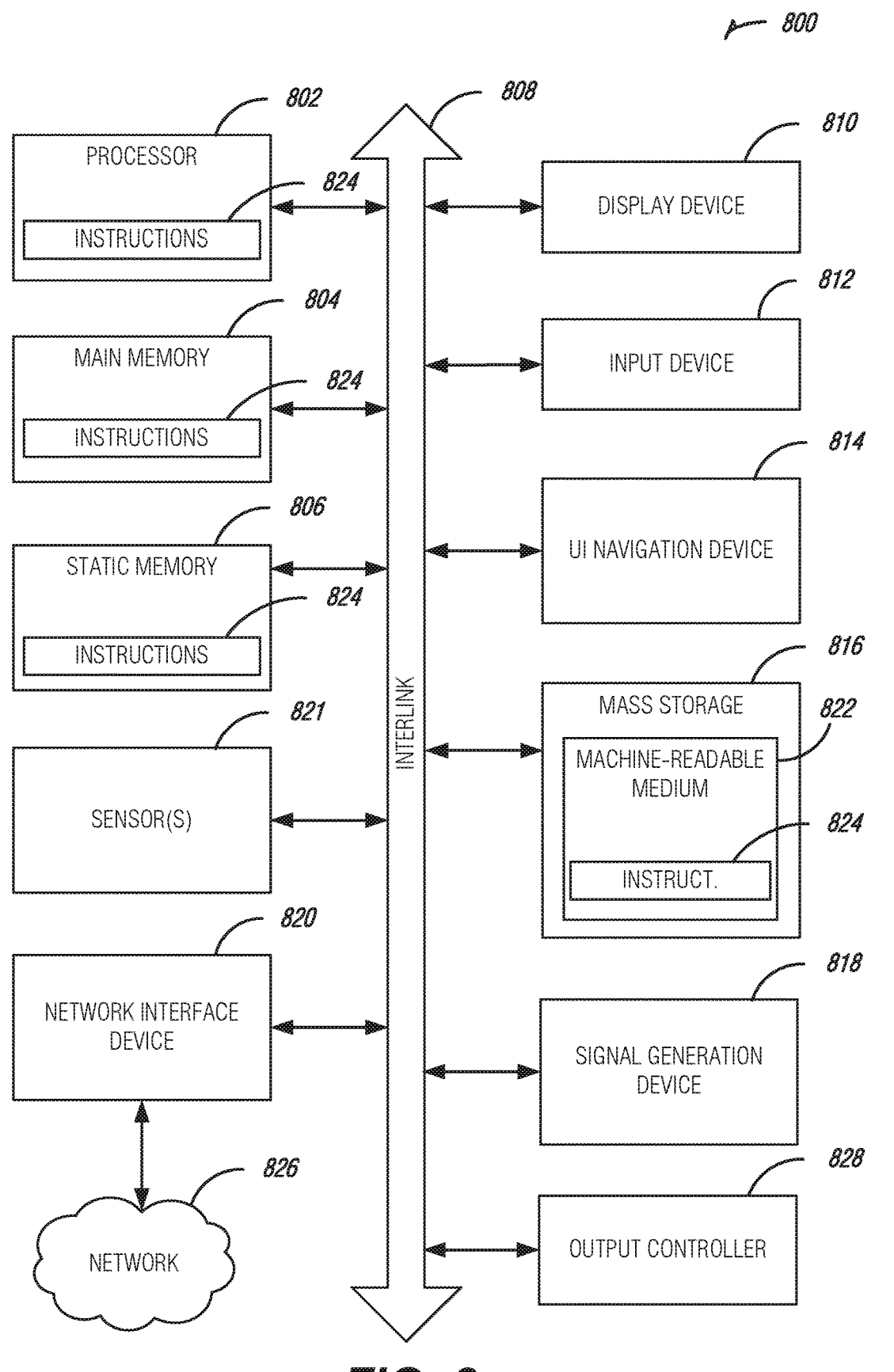
FIG. 8 is a block diagram illustrating an example of a machine upon which one or more embodiments may be implemented.

The system 105 as described in FIG. 1 and the machine learning component 200 may be implemented on one or more computing devices, such as machine 800 of FIG. 8. As such, some of the components of FIG. 1 may communicate with each other via inter-process communication and other local communications techniques (e.g., shared memory, pipes, buffers, queues). In other examples, the components of FIG. 1 may be parts of different services or systems and thus the components may communicate with each other through a computer network using computer networking protocols.

FIG. 5 illustrates an example of a file creation user interface 500 for automatic file creation and location selection standardization, according to an embodiment. The file creation user interface 500 includes a variety of configuration options that may be limited based on a higher level configuration based on identification of a file storage location and/or a file. A user is presented with the file creation user interface 500 when creating a new file and may select and apply the available configuration options. Thus, creation of the file creation may be limited to those configuration options enabled at a group level, storage location level, file type level, etc. The user or another user may have previously created a configuration (e.g., via the user interface 300 as described in FIG. 3, etc.) by selecting a series of configuration options. The user selects a template to be applied based on an organization and/or configuration and the user may specify a type of file and configuration preferences using the file creation user interface 500 and the file is generated for them upon confirmation.

Figure 6:
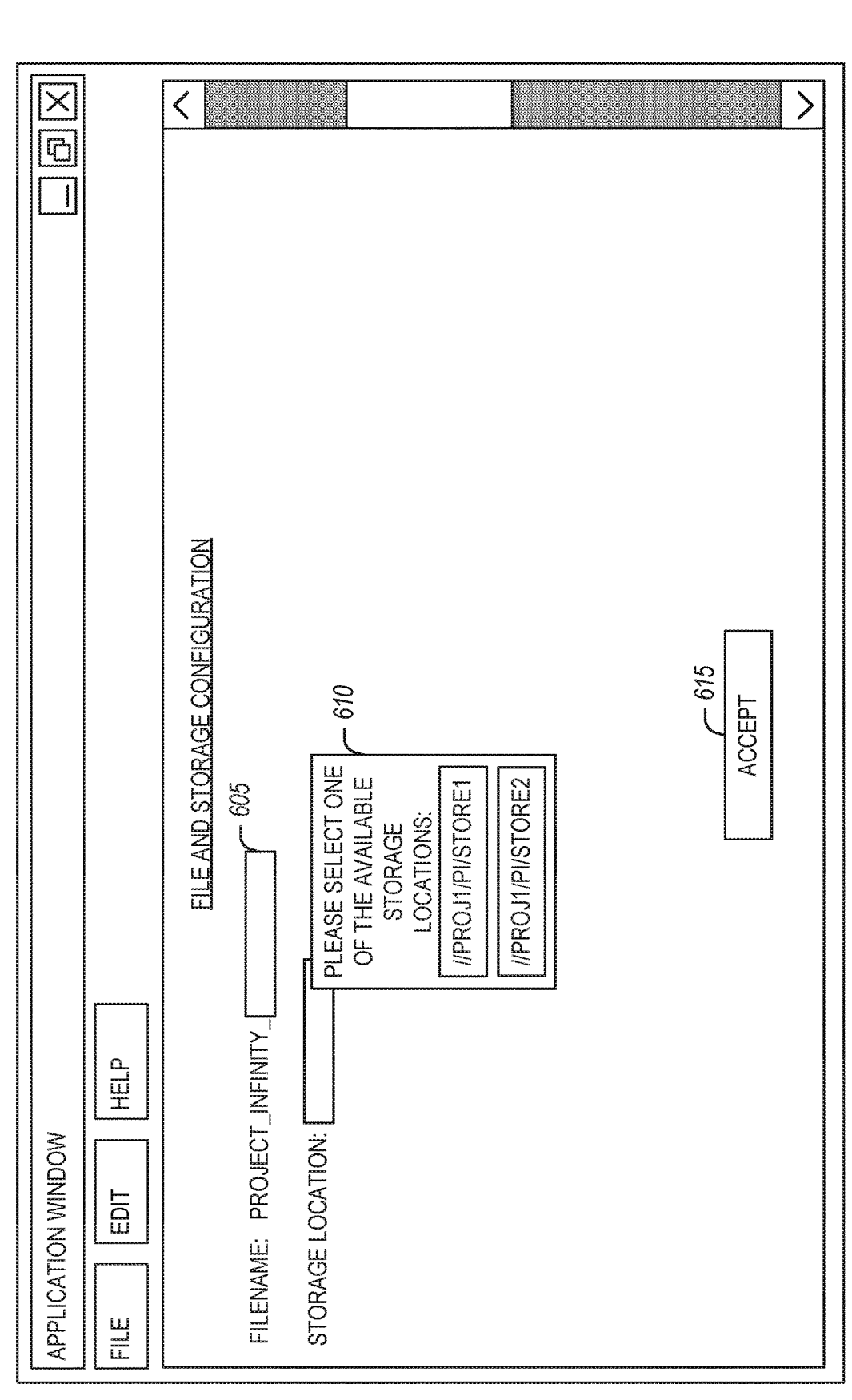
FIG. 6 illustrates an example of a user interface with configured mask and selection options for automatic file creation and location selection standardization, according to an embodiment.

FIG. 6 illustrates an example of a user interface 600 with configured mask and selection options for automatic file creation and location selection standardization, according to an embodiment. The example user interface may be presented to a user via an application when a file manipulation activity is initiated. The an electronic file storage structure configuration and an electronic file configuration may be obtained for the application (e.g., via the application interface 130, etc.) that may present options for the user. For example, the user interface may include a text control 605 that may be prefaced with a file name mask included in the file configuration and the user may be able to enter additional file name characters to complete the file name. A selection control may be presented in the user interface that when selected may display storage locations configured in the electronic file storage structure configuration. The user may select one of the available storage locations. Upon the user selecting an accept control 615, the file may be generated in the selected file storage location with the selected file name.

FIG. 7 illustrates an example of a method 700 for automatic file creation and location selection standardization, according to an embodiment. The method 700 may provide features as described in FIGS. 1 to 6.

At operation 705, an electronic file storage structure configuration is received for an application (e.g., of the application(s) 125, etc.) via a file storage system interface (e.g., the file system interface 130 as described in FIG. 1, etc.). In an example, the electronic file storage structure configuration may include at least one electronic file storage location within a file storage system (e.g., of the electronic file storage system(s) 120 as described in FIG. 1, etc.) data structure.

At operation 710, an electronic file configuration is received for the application via an application interface (e.g., the application interface 135 as described in FIG. 1, etc.). In an example, the electronic file configuration may include a file name mask. In an example, the application interface may include an application plugin for the application or a set of application programming interface commands.

At operation 715, a configuration prediction machine learning model is trained (e.g., by the machine learning processor 170 as described in FIG. 1, etc.) using the electronic file storage structure configuration, the electronic file configuration, and application data. At operation 720, user activity data is obtained for a user activity initiated using the application via the application interface. In an example, the user activity may be a file creation activity. At operation 725, the user activity data is evaluated using the configuration prediction machine learning model (e.g., by the machine learning processor 170 as described in FIG. 1, etc.) to output a predicted file storage structure configuration and a predicted file configuration.

At operation 730, a configuration user interface is generated (e.g., by the user interface manager 140 as described in FIG. 1, etc.) using the predicted file storage structure configuration and the predicted file configuration. In an example, a configuration option probability may be output for the user activity. Configuration data may be selected based on the configuration option probability and a user interface element of the configuration user interface may be populated with the configuration data. In an example, an authentication credential of the user may be received. An override rule may be identified for the configuration data based on the authentication credential and a data protection option may be set for the user interface element based on the override rule.

At operation 735, the configuration user interface is presented to a user. The configuration user interface includes a set of user interface controls for completing the user activity. In an example, a set of user prompts may be generated based on the predicted file storage structure configuration and the predicted file configuration. The set of user prompts may be presented in the configuration user interface. A set of responses to the set of user prompts may be received. Data elements of the configuration user interface may be populated using the set of responses. Upon receipt of selection of an acceptance user interface control, an electronic file may be generated based on the set of responses and the electronic file may be stored in a data structure of a file storage system based on the set of responses.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensors. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for automatic file creation and location selection standardization comprising:

at least one processor; and memory comprising instructions that, when executed by the at least one processor, cause the at least one processor to perform operations to:

receive an electronic file storage structure configuration for an application via a file storage system interface, the electronic file storage structure configuration comprising a file directory hierarchy;

receive an electronic file configuration for the application via an application interface, the electronic file configuration comprising file configuration commands for a file associated application, wherein the electronic file configuration comprises a file name mask that defines a required prefix for file names and a template comprising pre-filled data fields specific to a project type or file type;

train a configuration prediction machine learning model using the electronic file storage structure configuration, the electronic file configuration, and application data, wherein the application data comprises user selection patterns for file storage locations and file configuration options across multiple file creation instances for a plurality of users;

obtain user activity data for a user activity initiated using the application via the application interface, wherein the user activity comprises initiating a new file creation action within the application;

evaluate the user activity data using the configuration prediction machine learning model to output a predicted file storage structure configuration and a predicted file configuration, the evaluation comprising evaluating features extracted from the user activity data, wherein the features comprise at least one of: an application type identifier, a project identifier associated with the user activity, or a file type indicator associated with the user activity;

generate a configuration user interface using the predicted file storage structure configuration and the predicted file configuration, wherein generating the configuration user interface comprises:

automatically populating a file name field with the file name mask from the predicted file configuration as a non-editable prefix:

automatically populating a file location field with a file storage location from the predicted file storage structure configuration; and automatically populating at least one data field with pre-filled data from the template of the predicted file configuration; and present the configuration user interface to a user, the configuration user interface including a set of user interface controls for completing the user activity, wherein the user activity is completed by the user confirming the automatically populated fields and the system generating an electronic file based on the confirmed fields and storing the electronic file at the automatically populated file storage location.

2. The system of claim 1, wherein the electronic file storage structure configuration includes at least one electronic file storage location within a file storage system data structure.

3. The system of claim 1, wherein the file name mask comprises a project-specific prefix that is automatically applied to all files created for a designated project, and wherein the file name mask is enforced such that user input is appended to the file name mask prefix to create a complete file name.

4. The system of claim 1, wherein the user activity is a file creation activity.

5. The system of claim 1, the instructions to generate the configuration user interface further comprising instructions that, when executed by the at least one processor, cause the at least one processor to perform operations to:

output a configuration option probability for the user activity;

select configuration data based on the configuration option probability; and populate a user interface element of the configuration user interface with the configuration data.

6. The system of claim 5, the memory further comprising instructions that, when executed by the at least one processor, cause the at least one processor to perform operations to:

receive an authentication credential of the user;

identify an override rule for the configuration data based on the authentication credential; and set a data protection option for the user interface element based on the override rule.

7. The system of claim 1, wherein the application interface includes an application plugin for the application or a set of application programming interface commands.

8. The system of claim 1, the memory further comprising instructions that, when executed by the at least one processor, cause the at least one processor to perform operations to:

generate a set of user prompts based on the predicted file storage structure configuration and the predicted file configuration;

present the set of user prompts in the configuration user interface;

receive a set of responses to the set of user prompts;

populate data elements of the configuration user interface using the set of responses;

upon receipt of selection of an acceptance user interface control, generate an electronic file based on the set of responses; and store the electronic file in a data structure of a file storage system based on the set of responses.

9. At least one non-transitory machine-readable medium including instructions for automatic file creation and location selection standardization that, when executed by at least one processor, cause the at least one processor to perform operations to:

receive an electronic file storage structure configuration for an application via a file storage system interface, the electronic file storage structure configuration comprising a file directory hierarchy;

receive an electronic file configuration for the application via an application interface, the electronic file configuration comprising file configuration commands for a file associated application, wherein the electronic file configuration comprises a file name mask that defines a required prefix for file names and a template comprising pre-filled data fields specific to a project type or file type;

train a configuration prediction machine learning model using the electronic file storage structure configuration, the electronic file configuration, and application data, wherein the application data comprises user selection patterns for file storage locations and file configuration options across multiple file creation instances for a plurality of users;

obtain user activity data for a user activity initiated using the application via the application interface, wherein the user activity comprises initiating a new file creation action within the application;

evaluate the user activity data using the configuration prediction machine learning model to output a predicted file storage structure configuration and a predicted file configuration, the evaluation comprising evaluating features extracted from the user activity data, wherein the features comprise at least one of: an application type identifier, a project identifier associated with the user activity, or a file type indicator associated with the user activity;

generate a configuration user interface using the predicted file storage structure configuration and the predicted file configuration, wherein generating the configuration user interface comprises:

automatically populating a file name field with the file name mask from the predicted file configuration as a non-editable prefix;

automatically populating a file location field with a file storage location from the predicted file storage structure configuration; and automatically populating at least one data field with pre-filled data from the template of the predicted file configuration; and present the configuration user interface to a user, the configuration user interface including a set of user interface controls for completing the user activity, wherein the user activity is completed by the user confirming the automatically populated fields and the system generating an electronic file based on the confirmed fields and storing the electronic file at the automatically populated file storage location.

10. The at least one non-transitory machine-readable medium of claim 9, wherein the electronic file storage structure configuration includes at least one electronic file storage location within a file storage system data structure.

11. The at least one non-transitory machine-readable medium of claim 9, the instructions to generate the configuration user interface further comprising instructions that, when executed by the at least one processor, cause the at least one processor to perform operations to:
   output a configuration option probability for the user activity;
   select configuration data based on the configuration option probability; and
   populate a user interface element of the configuration user interface with the configuration data.

12. The at least one non-transitory machine-readable medium of claim 11, further comprising instructions that, when executed by the at least one processor, cause the at least one processor to perform operations to:
   receive an authentication credential of the user;
   identify an override rule for the configuration data based on the authentication credential; and
   set a data protection option for the user interface element based on the override rule.

13. The at least one non-transitory machine-readable medium of claim 9, wherein the application interface includes an application plugin for the application or a set of application programming interface commands.

14. The at least one non-transitory machine-readable medium of claim 9, further comprising instructions that, when executed by the at least one processor, cause the at least one processor to perform operations to:
   generate a set of user prompts based on the predicted file storage structure configuration and the predicted file configuration;
   present the set of user prompts in the configuration user interface;
   receive a set of responses to the set of user prompts;
   populate data elements of the configuration user interface using the set of responses;
   upon receipt of selection of an acceptance user interface control, generate an electronic file based on the set of responses; and
   store the electronic file in a data structure of a file storage system based on the set of responses.

15. A method for automatic file creation and location selection standardization comprising:
   receiving an electronic file storage structure configuration for an application via a file storage system interface, the electronic file storage structure configuration comprising a file directory hierarchy;
   receiving an electronic file configuration for the application via an application interface, the electronic file configuration comprising file configuration commands for a file associated application, wherein the electronic file configuration comprises a file name mask that defines a required prefix for file names and a template comprising pre-filled data fields specific to a project type or file type;
   training a configuration prediction machine learning model using the electronic file storage structure configuration, the electronic file configuration, and application data, wherein the application data comprises user selection patterns for file storage locations and file configuration options across multiple file creation instances for a plurality of users;
   obtaining user activity data for a user activity initiated using the application via the application interface, wherein the user activity comprises initiating a new file creation action within the application;
   evaluating the user activity data using the configuration prediction machine learning model to output a predicted file storage structure configuration and a predicted file configuration, the evaluation comprising evaluating features extracted from the user activity data, wherein the features comprise at least one of: an application type identifier, a project identifier associated with the user activity, or a file type indicator associated with the user activity;
   generating a configuration user interface using the predicted file storage structure configuration and the predicted file configuration, wherein generating the configuration user interface comprises:
      automatically populating a file name field with the file name mask from the predicted file configuration as a non-editable prefix;
      automatically populating a file location field with a file storage location from the predicted file storage structure configuration; and
      automatically populating at least one data field with pre-filled data from the template of the predicted file configuration; and
   presenting the configuration user interface to a user, the configuration user interface including a set of user interface controls for completing the user activity, wherein the user activity is completed by the user confirming the automatically populated fields and the system generating an electronic file based on the confirmed fields and storing the electronic file at the automatically populated file storage location.

16. The method of claim 15, wherein the file name mask comprises a project-specific prefix that is automatically applied to all files created for a designated project, and wherein the file name mask is enforced such that user input is appended to the file name mask prefix to create a complete file name.

17. The method of claim 15, wherein generating the configuration user interface further comprises:
   outputting a configuration option probability for the user activity;
   selecting configuration data based on the configuration option probability; and
   populating a user interface element of the configuration user interface with the configuration data.

18. The method of claim 17, further comprising:
   receiving an authentication credential of the user;
   identifying an override rule for the configuration data based on the authentication credential; and
   setting a data protection option for the user interface element based on the override rule.

19. The method of claim 15, wherein the application interface includes an application plugin for the application or a set of application programming interface commands.

20. The method of claim 15, further comprising:
   generating a set of user prompts based on the predicted file storage structure configuration and the predicted file configuration;
   presenting the set of user prompts in the configuration user interface;
   receiving a set of responses to the set of user prompts;

populating data elements of the configuration user interface using the set of responses;

upon receipt of selection of an acceptance user interface control, generating an electronic file based on the set of responses; and storing the electronic file in a data structure of a file storage system based on the set of responses.

\* \* \* \* \*